US011818173B2

(12) United States Patent
Sahni et al.

(10) Patent No.: US 11,818,173 B2
(45) Date of Patent: Nov. 14, 2023

(54) REDUCING MEMORY FOOTPRINT AFTER TLS CONNECTION ESTABLISHMENT

(71) Applicant: Palo Alto Networks, Inc., Santa Clara, CA (US)

(72) Inventors: Mohit Sahni, Fremont, CA (US); Saurabh Tripathi, San Jose, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 390 days.

(21) Appl. No.: 16/888,640

(22) Filed: May 29, 2020

(65) Prior Publication Data

US 2021/0377308 A1 Dec. 2, 2021

(51) Int. Cl.
*H04L 9/40* (2022.01)
*G06F 9/50* (2006.01)
*H04L 9/08* (2006.01)

(52) U.S. Cl.
CPC .......... *H04L 63/166* (2013.01); *G06F 9/5016* (2013.01); *G06F 9/5022* (2013.01); *H04L 9/085* (2013.01); *H04L 9/0819* (2013.01); *G06F 2209/5011* (2013.01)

(58) Field of Classification Search
USPC ........ 713/151, 150, 163, 181; 726/2, 21, 36; 380/255, 264, 276
See application file for complete search history.

(56) References Cited

U.S. PATENT DOCUMENTS

| 9,998,284 | B2* | 6/2018 | Zimmer | G06F 9/45558 |
| 2005/0108571 | A1* | 5/2005 | Lu | H04L 63/0853 726/4 |
| 2006/0041938 | A1* | 2/2006 | Ali | G06Q 20/40975 726/14 |
| 2013/0219168 | A1* | 8/2013 | Gearhart | H04L 63/0485 713/153 |

(Continued)

FOREIGN PATENT DOCUMENTS

WO 2005034052 A1 4/2005

OTHER PUBLICATIONS

Taubmann, et al., "DroidKex: Fast extraction of ephemeral TLS keys from the memory of Android apps", Elsevier Ltd, Digital Investigation, Proceedings of the Eighteenth Annual DFRWS USA, 2018, pp. S67-S76.

(Continued)

*Primary Examiner* — Sharif E Ullah
(74) *Attorney, Agent, or Firm* — GILLIAM IP PLLC

(57) ABSTRACT

For connection establishment, a system allocates memory that will be occupied by the data and handshake sub-protocol infrastructure that facilitates establishing a TLS connection. After connection establishment, the system allocates memory space for the data and record sub-protocol infrastructure that facilitates the asynchronous communication of application traffic. The memory space for the TLS session (i.e., the communication information separate from the handshake) has a substantially smaller footprint than the memory space for the TLS handshake. The TLS handshake (Continued)

memory space can be released and recycled for other connections while application communications use the smaller memory space allocated and populated with the TLS session data and infrastructure.

16 Claims, 5 Drawing Sheets

(56) References Cited

U.S. PATENT DOCUMENTS

| | | | | |
|---|---|---|---|---|
| 2014/0222813 A1* | 8/2014 | Yang | ........................ | G06F 16/95 707/736 |
| 2014/0281477 A1* | 9/2014 | Nayshtut | ............... | H04L 9/0825 713/150 |
| 2016/0112203 A1* | 4/2016 | Thom | ..................... | G06F 21/72 713/176 |
| 2016/0182499 A1* | 6/2016 | Sharaga | .................. | G06F 21/82 713/156 |
| 2016/0277933 A1* | 9/2016 | Moon | ..................... | H04W 4/80 |
| 2016/0308677 A1* | 10/2016 | Thom | .................... | H04L 9/3234 |
| 2017/0111373 A1* | 4/2017 | Morton | ................. | H04L 63/126 |
| 2017/0177449 A1* | 6/2017 | Bronk | ................... | H04L 63/062 |
| 2017/0289943 A1* | 10/2017 | Zhao | ...................... | H04W 12/35 |
| 2019/0149576 A1* | 5/2019 | Rajadurai | ................. | G06F 9/54 713/151 |
| 2019/0199683 A1* | 6/2019 | Kenyan | ............... | H04L 63/0209 |
| 2021/0336781 A1* | 10/2021 | Jia | ........................... | H04L 63/04 |
| 2021/0352051 A1* | 11/2021 | Schmitt | ............... | H04L 63/0823 |

OTHER PUBLICATIONS

PCT Application No. PCT/US2021/070604 International Search Report, dated Sep. 3, 2021, 4 pages.
PCT Application No. PCT/US2021/070604 International Written Opinion, dated Sep. 3, 2021, 9 pages.
PCT Application PCT/US2021/070604, International Preliminary Report on Patentability, dated Jun. 2, 2022, 9 pages.

* cited by examiner

REDUCING MEMORY FOOTPRINT AFTER TLS CONNECTION ESTABLISHMENT

BACKGROUND

The disclosure generally relates to transmission of digital information (CPC H04L) and subclass related to protocol performance (69/02).

The Transport Layer Security (TLS) protocol is defined to provide a secure channel between communicating peers (e.g., a client and a server). The TLS protocol relies upon a reliable, underlying transport (e.g., Transmission Control Protocol). The TLS protocol specifies that a TLS implementation should provide authentication, confidentiality, and integrity. TLS version 1.3 is specified in RFC 8446. Version 1.3 of the TLS protocol (hereinafter TLS 1.3) includes two sub-protocols: 1) a handshake protocol and 2) a record protocol. The handshake sub-protocol specifies that peers negotiate a protocol version, select cryptographic algorithms, authenticate at least the responding peer (optionally the peers authenticate each other), and establish a shared secret. After the handshake is complete, the peers communicate application-layer traffic according to the record sub-protocol using the established shared secret to protect the application-layer traffic.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. Well-known instruction instances, protocols, structures and techniques have not been shown in detail in order not to obfuscate the description.

Overview

The handshake sub-protocol of TLS creates and maintains a state machine for the handshake process. This state machine has a relatively large memory footprint. After the handshake completes and a connection is established between peers, the state machine continues to occupy memory space despite being unnecessary for communicating application data via the connection. In addition to the handshake state machine, available libraries to implement TLS (e.g., the OpenSSL library) also consume memory space despite some of the files relating to the handshake sub-protocol.

A memory efficient implementation of TLS as disclosed herein reduces its memory footprint by managing memory space allocation for the synchronous TLS connection establishment and the asynchronous TLS session. For connection establishment, a system allocates memory that will be occupied by the data and handshake sub-protocol infrastructure that facilitates establishing the TLS connection. The handshake state machine itself occupies a relatively large amount of the allocated memory space, especially when multiplied by the number of connections concurrently supported by a system. After connection establishment, the system allocates memory space for the data and record sub-protocol infrastructure that facilitates the asynchronous communication of application traffic. The memory space for the TLS session (i.e., the communication information separate from the handshake) has a substantially smaller footprint than the memory space for the TLS handshake, in some cases 15-20 times smaller. The TLS handshake memory space can be released and recycled for other connections while application communications use the smaller memory space allocated and populated with the TLS session data and infrastructure. This allows a greater number of connections to be supported without increasing memory hardware and/or assigning a larger portion of system memory for TLS connections.

Example Illustrations

Figure 1:
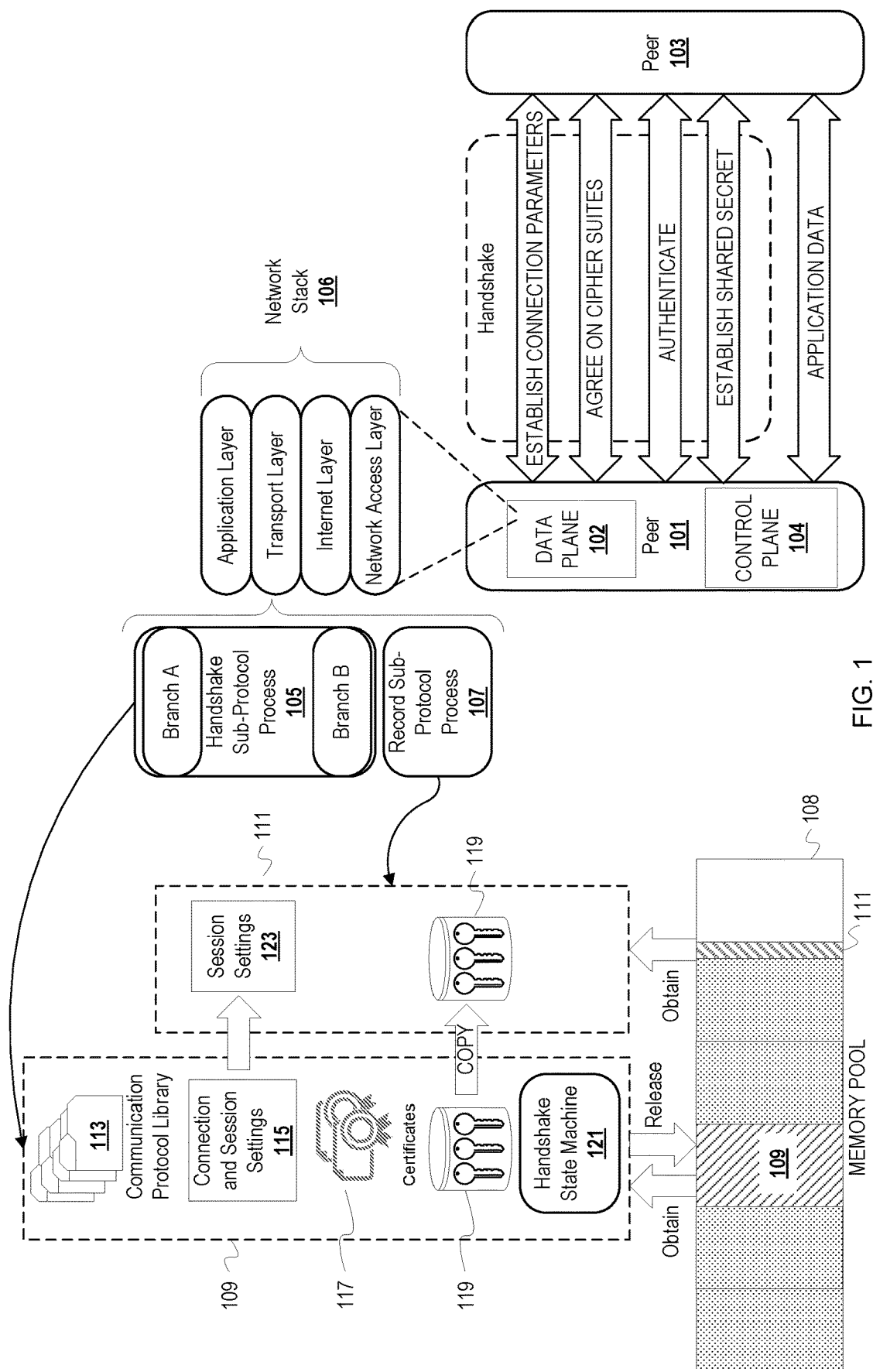
FIG. 1 is a conceptual diagram of memory efficient handling of a TLS connection and session.

FIG. 1 is a conceptual diagram of memory efficient handling of a TLS connection and session. The conceptual diagram illustrates reduction in memory footprint for a TLS session after a handshake as completed. FIG. 1 depicts a set of peers 101, 103 communicating with each other to establish a TLS connection and securely communicate over the established connection. The peer 103 is likely a client initiating the request with a server (peer 101). The peer 101 includes a control plane 104 and a data plane 102. The control plane 104 is configured with hardware (e.g., processors and memory) to support route updates, logging, management, etc. The data plane 102 is configured with hardware to support one or more instances of a network stack 106, fast traffic processing, traffic forwarding, etc. The network stack 106 is illustrated with an application layer, transport layer, Internet layer, and network access layer. The network stack 106 can be configured with different layers, which can involve different sets of communication protocols. The network stack 106 includes program code that implements protocols corresponding to the transport layer. In this case, the network stack 106 includes program code that implements TLS. This program code includes program code for the handshake sub-protocol and program code for the record sub-protocol. When the network stack 106 is instantiated, a handshake sub-protocol process 105 is instantiated and a record sub-protocol process 107 is instantiated. This handshake sub-protocol process 105 is instantiated based on program code that includes branch A and a branch B. Branch A corresponds to program code that is a first implementation of the handshake sub-protocol (e.g., a native or proprietary implementation of the handshake sub-protocol). Branch B corresponds to program code that is a second implementation of the handshake sub-protocol (e.g., a third party implementation). The program code from which the handshake sub-protocol process 105 is instantiated also include program code that directs execution to these branches depending upon the version of TLS for a connection. This other program code ("infrastructure code") also obtains and release memory space/blocks from a memory pool 108 for connections.

The peer 103 begins the exchange of messages for establishing a TLS connection with a hello message. The peers 101, 103 then exchange messages for establishing a secure TLS connection in accordance with the handshake sub-protocol. The handshake sub-protocol includes establishing connection parameters, agreeing on cipher suites, authentication of the peers, and establishment of a shared secret. The establishing of connection parameters overlaps with agreeing on the cipher suites since the initial client hello messages lists out cipher suite supported by the initiating peer (client). The initial message also specifies a TLS version as one of the connection parameters. The initial parameters communicated from the client also include a client random number. The responding peer (server) responds with selection of offered cipher suites for key exchange, selection of extensions, and the server random number. In addition, the server signs the response with a signature algorithm chosen from the cipher suites offered by the client. The client and server generate and exchange keys. After the handshake ends, the peers 101, 103 can asynchronously communicate application data over the secure TLS connection.

Prior to any connection requests, the transport layer is allocated the memory pool 108. This may be allocated from an operating system, from the network stack 106, or some other entity that manages resources of the peer 101. Prior to or coincident with the handshake sub-protocol process 105 detecting an initial client hello message, a memory block 109 is allocated for the connection from the memory pool 108.

The handshake sub-protocol process 105 stores information and instantiates structures for the handshake in the memory block 109. During the handshake, the handshake sub-protocol process 105 loads a communication protocol library 113 into the memory block 109. The handshake sub-protocol process 105 determines from the client hello message that a connection is being requested in accordance with TLS 1.3. For TLS 1.3, the peer 101 uses the communication protocol library 113 for the handshake. The handshake sub-protocol process 105 then begins to invoke functions defined in the library 113 to implement the handshake sub-protocol. From the handshake, the handshake sub-protocol process 105 stores connection and session settings 115, certificate(s) 117, and cryptographic keys 119. The handshake sub-protocol process 105 also invokes a function of the communication protocol library 113 to instantiate a handshake state machine 121. As reflected by the name, the handshake state machine 121 is a state machine that is updated to reflect current state of the synchronous handshake communications between the peers 101, 103. This guides the handshake sub-protocol process 105 in responding to client messages.

After the handshake completes, the handshake sub-protocol process 105 obtains a memory block 111 for session and connection information for an active connection. This memory block 111 is less than the memory block 109 because the information and data structures for establishing the secure connection consume more space than the information and structures for communicating over the established connection. The handshake sub-protocol process 105 copies over the keys 119 from the memory block 109 to the memory block 111. The handshake sub-protocol process 105 also writes/copies session settings 123, which is a subset of the settings 115. The session settings 123 includes contextual information for the session (e.g., compression and padding settings, initialization vector, record sequence numbers, cipher suite information). The handshake sub-protocol process 105 then releases the memory block 109 to the memory pool 108, which allows that memory block to be reused for a different connection. The record sub-protocol process 107 begins using the information in the memory block 111 for communications.

The reduction in memory footprint when transitioning from connection establishment to utilization can be from 15-25 kilobytes down to less than 2 kilobytes. With the reduced memory consumption by active connections, the same sized memory pool can support a greater number of active connections. The memory space that was used to support a single active connection can now be used to support approximately 10-15 connections. For instance, the memory pool that could support 1000 connections can now support 10,000 connections.

Figure 2:
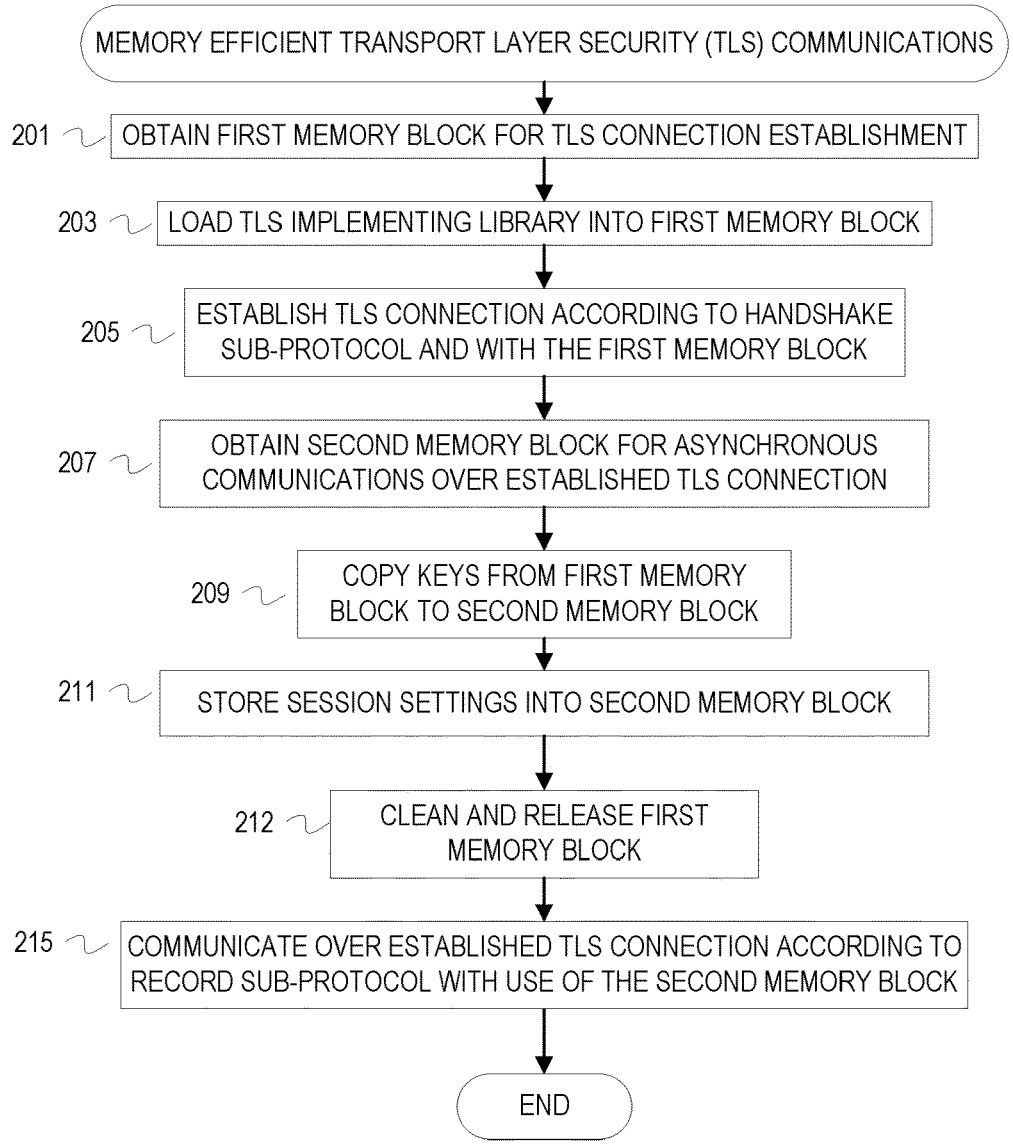
FIG. 2 is a flowchart of example operations for memory efficient TLS communications.

FIG. 2 is a flowchart of example operations for memory efficient TLS communications. The example operations of FIGS. 2-4 will be described with reference to a transport layer process for consistency with FIG. 1. As discussed, program code underlying a network stack will include various programs that implement different communication/ network protocols. This "transport layer code" not only implements (directly or by invocation) a transport layer protocol, more specifically TLS, but also includes program code related to implementation of the protocol (e.g., resource management and invocation of functions that implement protocols).

At block 201, a transport layer process obtains a first memory block for establishing a TLS connection. Obtaining the memory block can be from a memory pool that has been allocated to the network stack and/or the transport layer. An operating system, the network stack itself, or some other resource management entity may allocate the memory pool. To obtain the first memory block, the transport layer process submits a request for memory and specifies an amount of the memory space sufficient for establishing the TLS connection (e.g., 20 kilobytes). With fixed sized memory blocks, the request can indicate a number of memory blocks to obtain from the memory pool. For instance, a resource manager may allocate 1 kilobyte blocks from the memory pool. Although the transport layer process may request 20 of these fixed size blocks, the 20 blocks are a block from the perspective of the transport layer process. Thus, a memory block accessed by a transport layer process is the region of memory allocated or assigned to the process for connection establishment and/or data communications regardless of that block being formed from multiple fixed-size blocks of the memory pool.

At block 203, the transport layer process loads a library that implements TLS into the first memory block. For instance, the transport layer process loads an OpenSSL library that implements TLS 1.3. The network stack may load this third party library instead of proprietary program code to comply with customer requests/requirement or compatibility with devices of other manufacturers.

At block 205, the transport layer process establishes a TLS connection according to the handshake sub-protocol and with the first memory block. The transport layer process performs the operations for the handshake and stores the corresponding information and structures into the first memory block. This includes storing and accessing the handshake state machine in the first memory block.

At block 207, the transport layer process obtains a second memory block for asynchronous communications over the established TLS connection. The transport layer process submits another memory request to a manager of the memory pool but specifies a smaller memory amount than previously requested. The requested second memory is sufficient for communications over the established connection (e.g., 1-2 kilobytes).

At block 209, the transport layer process copies keys from the first memory block to the second memory block. The keys will be used by the transport layer process to communicate application data.

At block 211, the transport layer process stores session settings into the second memory block. The transport layer process can copy over or extract the session settings from the connection information determined during connection establishment (e.g., selected cipher suite identifier, compression method, padding, initialization vector, record sequence numbers, etc.). Examples of other information determined from connection establishment that may not be copied over after the handshake include version number and list of cipher suites from the client. Embodiments may copy over this other information to the second memory block since the difference in memory consumption would be relatively small.

At block 212, the transport layer process cleans and releases the first memory block. Even if the memory pool is serviced by a garbage collector or similar process to sanitize released or returned memory blocks, the transport layer process at least cleans the first memory block of the cryptographic keys and shared secret. For instance, the transport layer process writes over the blocks of the first memory block corresponding to the keys and shared secret with 0s. Or the transport layer process writes over the entire first memory block with 0s. To release the cleaned memory block, the transport layer process communicates to a manager of the memory pool. The communication may identify the first memory block with a block identifier, address range, and/or associated process/connection identifier. The memory pool manager then marks the block(s) as available. For example, the memory pool manager clears a process identifier that identifies the transport layer process or clears a connection identifier.

At block 215, the transport layer process communicates over the established TLS connection according to a record sub-protocol with the second memory block. For instance, the transport layer process encapsulates and decapsulates messages received from a lower layer or higher layer according to the record sub-protocol. The transport layer process will access in the second memory block the session settings for formatting messages and the keys for encrypting data.

Although an entity can develop the program code for TLS communications, industry/market demands and/or device compatibility in a heterogeneous network can lead to use of external program code (e.g., libraries). As discussed above, an external library (e.g., the OpenSSL library) may be used by an entity for the handshake sub-protocol and internal or first party program code is used to implement the record sub-protocol of TLS. In some cases, an external library is employed for a specific version of TLS, such as TLS 1.3 while first party program code is used for both the handshake and record sub-protocols of other versions. A protocol stack instance will presumably begin with proprietary or first party program code and branch to a different execution path that involves the external or third-party library for the handshake sub-protocol and return to the first party program code after connection establishment.

Figure 3:
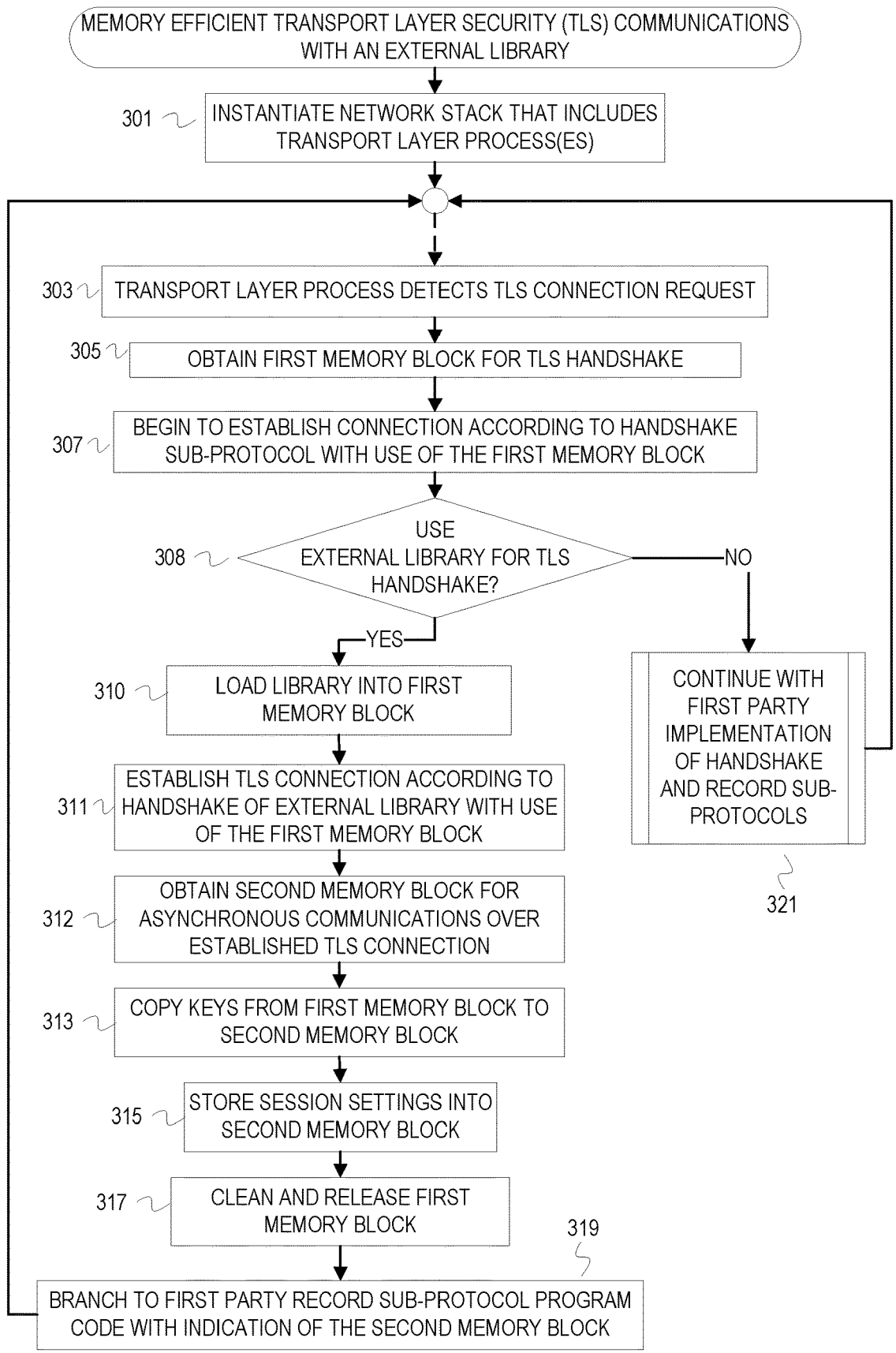
FIG. 3 is a flowchart of example operations for memory efficient TLS communications with an external library.

FIG. 3 is a flowchart of example operations for memory efficient TLS communications with an external library. Some of the example operations in FIG. 3 are similar to those in FIG. 2. The operations depicted by blocks 201, 203, 207, 209, 212, and 213 are respectively similar to blocks 305, 310, 312, 313, 315, and 317. Blocks 307 and 311 together are similar to block 205.

At block 301, a protocol/network stack is instantiated. The protocol stack instance includes a transport layer process or transport layer instance. The protocol stack can be instantiated at startup/reset of a host device and/or based on an explicit command to instantiate the protocol stack. The transport layer process monitors a message or event queue.

At block 303, the transport layer process detects a TLS connection request (i.e., client hello message). The transport layer process detects receipt of data or a message from a lower layer process. In some implementations, a message handler detects a received message and routes the message to the transport layer process based on reading a header of the message and determining that the header identifies the message as a TLS message.

At block 305, the transport layer process obtains a first memory block for establishing a TLS connection. As described previously, the transport layer process obtains the memory block sufficient for connection establishment from a memory pool.

At block 307, the transport layer process begins to establish the connection according to the TLS handshake sub-protocol with use of the obtained first memory block. The transport layer process reads the TLS request message to determine parameters or requested settings for the TLS connection. This includes reading a version identifier, cipher suites, etc., from the client hello message.

At block 308, the transport layer process determines whether to use an external library for the TLS handshake. The condition for using an external library is based on at least one of the values communicated in the client hello message. The condition can specify that a first party implementation of the handshake sub-protocol is used if version x or less than version x is indicated in the connection request. For instance, the condition may specify that the first party implementation be used for any TLS version below 1.3 and that an external or third party implementation be used for version 1.3 and greater. If the transport layer process determines that an external library is not to be used for the TLS handshake, then program flow continues to block 321. At block 321, the transport layer process continues with the first party implementation or proprietary program code for the handshake and record sub-protocols.

If the transport layer process determines that an external library is to be used for the handshake sub-protocol, then the transport layer process loads the external library into the first memory block at block 310. The transport layer process loads the external library into the first memory block to facilitate quick access of the library defined functions for the handshake sub-protocol.

At block 311, the transport layer process finishes establishing a TLS connection according to the handshake sub-protocol as implemented by the external library. The transport layer process performs the operations for the handshake and stores the corresponding information and structures into the first memory block. This includes storing and accessing the handshake state machine in the first memory block. When switching from executing the first party program code to the external library for the handshake, an inter-process message may be generated and sent. For example, a new thread or process can be spawned corresponding to the external library and a message sent from the transport layer process or a child process of the transport layer process to the newly spawned thread/process. The message can pass control and/or an identifier of the obtained memory block.

At block 312, the transport layer process obtains a second memory block for asynchronous communications over the established TLS connection. The transport layer process submits another memory request to a manager of the memory pool but specifies a smaller memory amount than previously requested.

At block 313, the transport layer process copies keys from the first memory block to the second memory block. The keys will be used by the transport layer process to communicate application data.

At block 315, the transport layer process stores session settings into the second memory block. The transport layer process can copy over or extract the session settings from the connection information determined during connection establishment (e.g., selected cipher suite identifier, shared secret, compression method, padding, session identifier, initialization vector, record sequence numbers, etc.).

At block 317, the transport layer process cleans and releases the first memory block. The transport layer process at least cleans the first memory block of the cryptographic keys and shared secret. For instance, the transport layer process writes over the blocks of the first memory block corresponding to the keys and shared secret with 0s. Or the transport layer process writes over the entire first memory block with 0s.

At block 319, the transport layer process branches to first party program code that implements the record sub-protocol of TLS for data communications over the established connection. The branching may be an invocation of the first party program code that passes an identifier of the second memory block as an argument. The branching can also be evidenced with an inter-process communication. For example, a process corresponding to the external library can send a message to the transport layer process or a child process of the transport layer process that passes control and/or indicates the second memory block.

If TLS connection is established for a version of TLS that supports renegotiation of the connection, then the external library may be used again for the renegotiation. Since a reduced size memory block has already been allocated for the session(s) using the connection to be renegotiated, the memory block could be reused without the overhead of releasing it and obtaining another reduced size memory block after the renegotiation.

Figure 4:
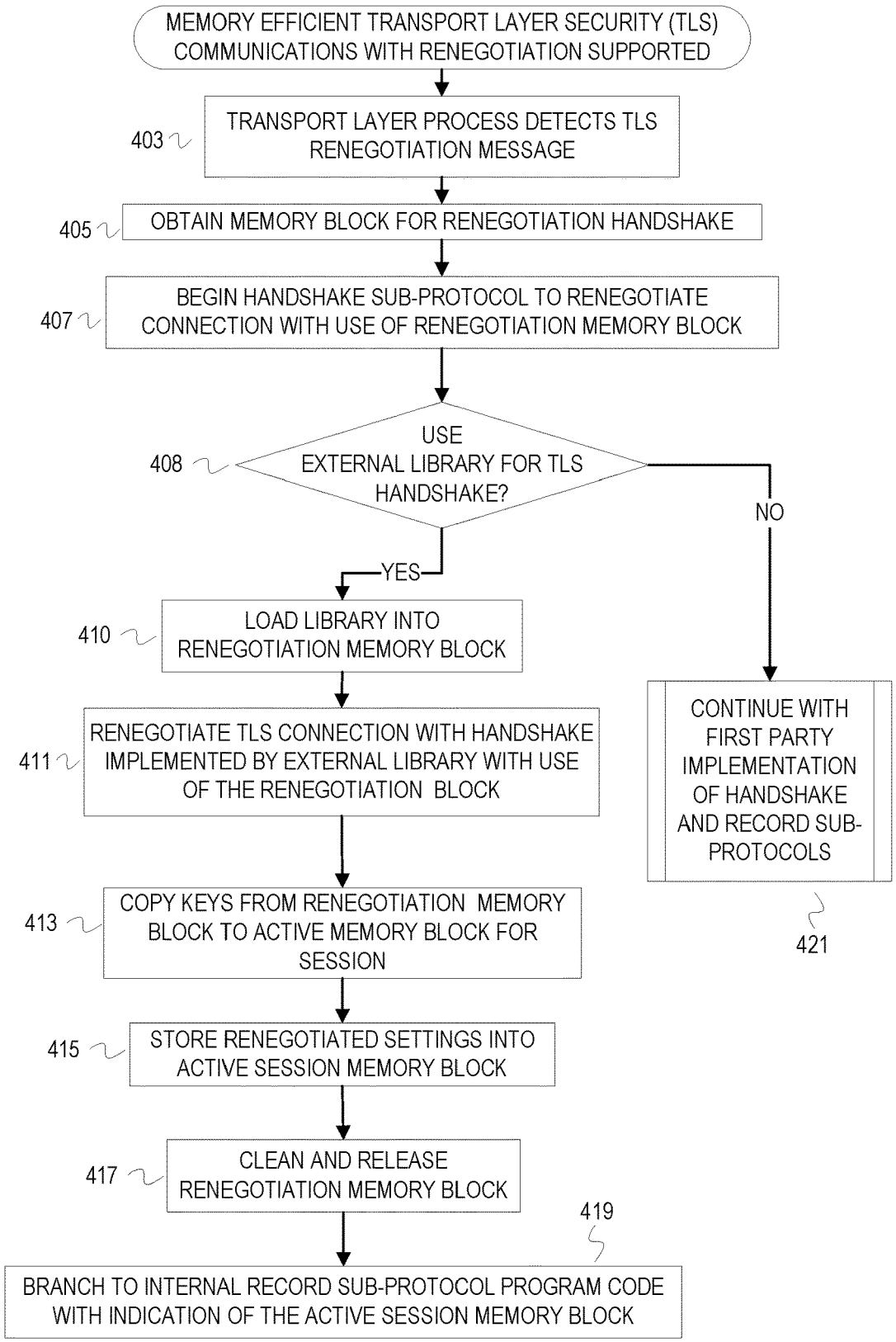
FIG. 4 is a flowchart of example operations for memory efficient TLS communications with renegotiation supported.

FIG. 4 is a flowchart of example operations for memory efficient TLS communications with renegotiation supported. Some of the example operations in FIG. 4 are similar to those in FIG. 3. The operations depicted by blocks 405, 407, 408, 410, 413, 415, 417, and 419 are respectively similar to blocks 305, 307, 308, 310, 313, 315, 317, and 319.

At block 403, a transport layer process detects a renegotiation message. The renegotiation message can be initiated by either peer of an established connection. The renegotiation message, assuming renegotiation is allowed for the connection between the peers, initiates a new handshake over the already established connection.

At block 405, the transport layer process obtains a memory block for renegotiation of the TLS connection. The memory block currently being used for the established connection to communicate application data ("active session memory block") supports data communications but is insufficient for the handshake. Therefore, the transport layer process requests another memory block for the renegotiation that is larger than the currently allocated memory block.

At block 407, the transport layer process begins to renegotiate the connection according to the TLS handshake sub-protocol. The transport layer process uses the newly requested memory block ("renegotiation memory block") for the handshake of the renegotiation.

At block 408, the transport layer process determines whether to use an external library for the TLS handshake. The condition for using an external library is based on at least one of the values communicated in the client hello message. The condition can specify that a first party implementation of the handshake sub-protocol is used if the renegotiation specifies a particular cipher suite. If the transport layer process determines that an external library is not to be used for the TLS handshake, then program flow continues to block 421. At block 421, the transport layer process continues with the first party implementation or proprietary program code for the handshake and record sub-protocols.

If the transport layer process determines that an external library is to be used for the handshake sub-protocol, then the transport layer process loads the external library into the first memory block at block 410. The transport layer process loads the external library into the renegotiation memory block to facilitate quick access of the library defined functions for the handshake sub-protocol.

At block 411, the transport layer process finishes the renegotiation handshake as implemented by the external library. The transport layer process performs the operations for the handshake and stores the corresponding information and structures into the renegotiation memory block. This includes storing and accessing the handshake state machine in the renegotiation memory block.

At block 413, the transport layer process copies keys from the renegotiation memory block to the existing active session memory block. The keys will be used by the transport layer process to communicate application data over the renegotiated connection. The transport layer process overwrites the previously used cryptography keys with the keys from the renegotiation. In some embodiments, the transport layer process clears the previously used cryptography keys and then writes the new keys into the active session memory block.

At block 415, the transport layer process updates session settings into the second memory block. A previously assigned session identifier may already be in the active session block. The transport layer process can copy over or extract the session settings that were impacted by the renegotiation.

At block 417, the transport layer process cleans and releases the renegotiation memory block. The transport layer process at least cleans the renegotiation memory block of the cryptographic keys and shared secret. For instance, the transport layer process writes over the blocks of the renegotiation memory block corresponding to the keys and shared secret with 0s. Or the transport layer process writes over the entire first memory block with 0s.

At block 419, the transport layer process branches to first party program code that implements the record sub-protocol of TLS for data communications over the established connection. The branching may be an invocation of the first party program code that passes an identifier of the second memory block as an argument.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
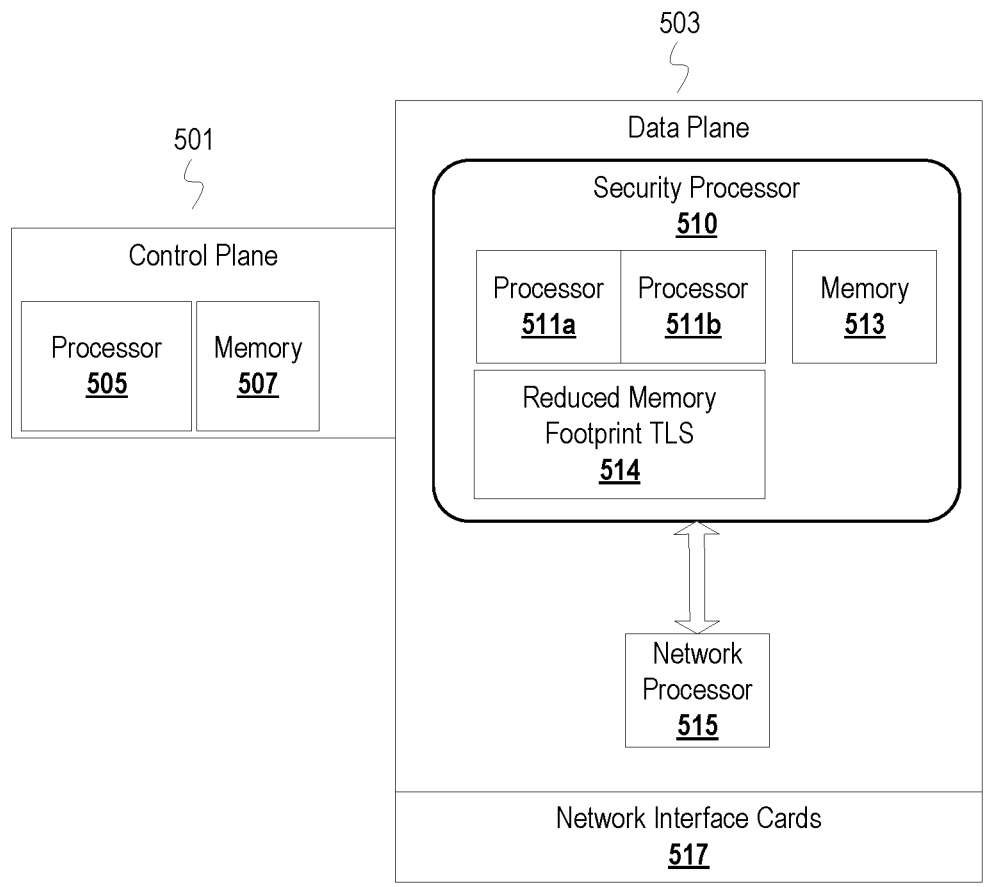
FIG. 5 depicts a system with a reduced memory footprint TLS module.

FIG. 5 depicts a system with a reduced memory footprint TLS module. The device depicted in FIG. 5 can be a security appliance (e.g., firewall, border controller) and/or network device (e.g., router, switch, gateway). The system includes a control plane 501 and a data plane 503. These planes 501, 503 can be logical distinctions or physically distinct (e.g., different cards). The control plane 501 includes a processor 505 (e.g., multi-core processor) and memory 507. The control plane 501 includes hardware programmed for various control/management operations, examples of which include policy management, route updates, and logging. The memory 507 of the control plane 501 may be a combination of volatile memory devices (e.g., random access memory) and non-volatile memory/storage (e.g., flash storage). The data plane 503 includes hardware configured and programmed for traffic handling operations that can include security operations, traffic forwarding, traffic analysis, etc. The data plane 503 includes a security processor 510 and a network processor 515. The security processor 510 includes processors 511a, 511b and memory 513. The memory 513 can be shared across the processors 511a, 511b. The data plane 503 also includes a reduced memory footprint TLS module 514. This module 514 performs the already described functionality for reducing memory footprint of TLS after a connection is established. The reduced memory footprint TLS module 514 may be hardware, software, or a combination of hardware and software. The module 514 is depicted as a separate unit, but may be program code loaded in the memory 513. A memory pool allocated to a transport layer process(es) is allocated from the memory 513, which may be one or multiple memory devices. The data plane 503 also includes a network processor 515 that is hardware configured and programmed for route lookup, network processing, network address translation, etc. The network processor 515 reads packets/frames from network interface cards 517.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
obtaining a first memory space for establishing a transport layer security (TLS) connection;
obtaining a second memory space that is smaller than the first memory space;
after the TLS connection is established,
copying cryptographic keys and TLS session information from the first memory space to the second memory space;
cleaning the first memory space after the cryptographic keys and TLS session information are copied, wherein the cleaning comprises at least cleaning the cryptographic keys and a shared secret from the first memory space;
releasing the first memory space after cleaning the first memory space; and
indicating the second memory space for asynchronous communications over the established TLS connection.

2. The method of claim 1 further comprising loading an OpenSSL library into the first memory space, wherein the TLS connection is established using the OpenSSL library.

3. The method of claim 2 further comprising executing program code distinct from the OpenSSL library for the record layer sub-protocol of the TLS protocol.

4. The method of claim 1, wherein the first and second memory spaces are obtained from a memory pool allocated for TLS connections.

5. The method of claim 1 further comprising branching to a second program code to implement the record sub-protocol of TLS from a first program code that implements the handshake sub-protocol of TLS, wherein an executing instance of the second program code uses the second memory space for data communications over the established TLS connection.

6. The method of claim 1, wherein the TLS connection complies with version 1.3 of the TLS protocol.

7. The method of claim 1 further comprising:
detecting a renegotiation request;
obtaining a third memory space, wherein the third memory space has a size substantially similar to the first memory space; and
after renegotiation of the TLS connection,
copying renegotiated cryptographic keys from the third memory space to the second memory space; and
releasing the third memory space.

8. A non-transitory, computer-readable medium having program code to:
obtain a first memory space for establishing a transport layer security (TLS) connection;
obtain a second memory space that is smaller than the first memory space;
after the TLS connection is established,
copy cryptographic keys and TLS session information from the first memory space to the second memory space;
clean at least cryptographic keys and a shared secret from the first memory space after the cryptographic keys and TLS session information are copied;
release the first memory space after cleaning the first memory space; and
indicate the second memory space for asynchronous communications over the established TLS connection.

9. The non-transitory, computer-readable medium of claim 8, wherein the program code comprises program code to asynchronously communicate application data over the established TLS connection based, at least in part, on the cryptographic keys and session information in the second memory space.

10. The non-transitory, computer-readable medium of claim 8, wherein the program code comprises program code to load into the first memory space third party program code that implements the handshake sub-protocol of TLS, wherein the TLS connection is established with the third party program code implementation of the handshake sub-protocol.

11. The non-transitory, computer-readable medium of claim 10, wherein the program code further comprises program code to execute first party program code that implements the record layer sub-protocol of the TLS protocol after the TLS connection is established.

12. The non-transitory, computer-readable medium of claim 8, wherein the first and second memory spaces are obtained from a memory pool allocated for TLS connections.

13. The non-transitory, computer-readable medium of claim 8, wherein the TLS connection complies with version 1.3 of the TLS protocol.

14. The non-transitory, computer-readable medium of claim 8, wherein the program code comprises program code to:
detect a renegotiation request;
obtain a third memory space, wherein the third memory space has a size substantially similar to the first memory space; and
after renegotiation of the TLS connection,
copy renegotiated cryptographic keys from the third memory space to the second memory space; and
release the third memory space.

15. An apparatus comprising:
a processor;
memory; and
a computer-readable medium having instructions stored thereon that are executable by the processor to cause the apparatus to,
determine a transport layer security (TLS) version indicated in a TLS connection request;
based on a determination that the indicated MS version satisfied a third party program code condition,
load third party program code that implements the TLS handshake sub-protocol;
use a first memory space for a TLS handshake corresponding to the TLS connection request;
after the TLS connection is established,
copy cryptographic keys and TLS session information from the first memory space to a second memory space that is smaller than the first memory space;
clean at least the cryptographic keys and a shared secret from the first memory space after copying the cryptographic keys and the TLS session information from the first memory space;
release the first memory space after cleaning the first memory space; and
execute first party program code that implements the TLS record layer sub-protocol with an indication of the second memory space.

16. The apparatus of claim 15, wherein the computer-readable medium further has stored thereon instructions executable by the processor to cause the apparatus to obtain the first memory space and the second memory space from a memory pool allocated from the memory for TLS connections, wherein the first memory space is released back to the memory pool.

* * * * *